United States Patent
Frederiksen et al.

(10) Patent No.: US 7,369,521 B2
(45) Date of Patent: May 6, 2008

(54) POWER CONTROL DURING RETRANSMISSION

(75) Inventors: Frank Frederiksen, Klarup (DK); Preben Mogensen, Gistrup (DK)

(73) Assignee: Nokia Corporation, Espoo (FI)

( * ) Notice: Subject to any disclaimer, the term of this patent is extended or adjusted under 35 U.S.C. 154(b) by 640 days.

(21) Appl. No.: 10/521,771

(22) PCT Filed: Aug. 30, 2002

(86) PCT No.: PCT/IB02/03569

§ 371 (c)(1), (2), (4) Date: Jan. 21, 2005

(87) PCT Pub. No.: WO2004/021603

PCT Pub. Date: Mar. 11, 2004

(65) Prior Publication Data

US 2005/0283663 A1    Dec. 22, 2005

(51) Int. Cl.
*H04B 7/185* (2006.01)

(52) U.S. Cl. ........... 370/318; 455/522; 455/69; 455/67.11; 370/320; 370/332; 370/333

(58) Field of Classification Search ........... 455/13.4, 455/522, 67.11–67.16, 69; 370/318–320
See application file for complete search history.

(56) References Cited

U.S. PATENT DOCUMENTS

| | | | |
|---|---|---|---|
| 5,727,033 A * | 3/1998 | Weaver et al. | 375/358 |
| 6,181,738 B1 * | 1/2001 | Chheda et al. | 375/224 |
| 6,493,541 B1 * | 12/2002 | Gunnarsson et al. | 455/69 |
| 6,564,067 B1 * | 5/2003 | Agin | 455/522 |
| 6,754,505 B1 * | 6/2004 | Baker et al. | 455/522 |
| 7,136,666 B2 * | 11/2006 | Charriere et al. | 455/522 |
| 2002/0027897 A1 | 3/2002 | Moulsley et al. | |
| 2002/0042283 A1 * | 4/2002 | Moulsley | 455/517 |
| 2003/0003875 A1 * | 1/2003 | Oestreich | 455/69 |
| 2003/0092463 A1 * | 5/2003 | Charriere et al. | 455/522 |
| 2003/0109274 A1 * | 6/2003 | Budka et al. | 455/522 |
| 2004/0248609 A1 * | 12/2004 | Tamura | 455/522 |
| 2006/0148508 A1 * | 7/2006 | Jeong et al. | 455/522 |

FOREIGN PATENT DOCUMENTS

EP    1 207 644 A2    5/2002

* cited by examiner

*Primary Examiner*—George Eng
*Assistant Examiner*—Mehmood B Khan
(74) *Attorney, Agent, or Firm*—Squire Sanders & Dempsey L.L.P.

(57) ABSTRACT

The present invention relates to a method and a device for controlling power in a network transmitted from a first station to a second station. The second station determines a power target value for a signal received from the first station and sends power control commands to the first station depending on a deviation between said power target value and a received power level. The second station detects faulty data blocks received from the first station and requests retransmission of faulty data blocks from the first station. The adjustment of the power target value to a temporary power target value during the retransmission is performed such that the temporary power target value is calculated depending on the quality of a faulty data block.

19 Claims, 5 Drawing Sheets

POWER CONTROL DURING RETRANSMISSION

FIELD OF THE INVENTION

The present invention relates to a method and a device for controlling power in a network transmitted from a first station, such as a mobile station, to a second station, such as a base station.

BACKGROUND OF THE INVENTION

Power control is one of the most important requirements for cellular network systems, such as Universal Mobile Telecommunications Systems (UMTS) employing WCDMA (Wideband Code Division Multiple Access), in particular on the uplink, i.e. from a mobile station to a base station.

Without a suitable power control mechanism a single mobile station could block an entire cell, if that mobile station is overpowered.

Given that two mobile stations are operating within the same frequency, the base station can only separate both mobile stations by their respective spreading codes. If the first one of both mobile stations is operated near by the edge of the cell it may suffer a path loss, e.g. 60 dB above that of the second mobile station which is assumed to be nearby the corresponding base station.

If there would be no power control mechanism for the mobile stations, controlling the respective power levels of both mobile stations, such that the base station receives signals from both mobile stations at about the same level, the mobile station nearby the base station could easily "over-shout" the mobile station at the edge of the cell. Thus, the mobile station nearby the base station could block at least a large part of the cell.

Therefore, it is desirable to equalize the received power per bit of all mobile stations (received by the base station) at any time in order to maximize network capacity.

A known solution for this kind of problem is the so-called fast closed-loop power control wherein in the uplink the base station carries out estimates of the received signal-to-interference ratio (SIR) and compares the estimated SIR to a target SIR. If the SIR measured for a certain mobile station is higher than the target SIR, the base station will send a power control command to the respective mobile station indicating the mobile station to lower the power. If, however, the measured SIR is too low, the base station will send a power control command to this mobile station indicating the mobile station to increase the power.

This mechanism of measuring SIR, sending power control commands, and adjusting the transmission power by the mobile station is performed at a rate of 1500 times per second, i.e. with a frequency of 1.5 kHz for each mobile station. Thus, this mechanism operates faster than any significant change of path loss could possibly happen. However, this mechanism applies only to mobile station velocities lower than approximately 50 km/h. For velocities higher than this, other features like outer loop power control should take over and adjust the EB/N0 target to ensure proper operation. Therefore, this power control mechanism is called fast transmit power control (TPC).

As a result, the base station informs the mobile station by corresponding power control commands which power level is to be used for transmission in the next slot (660 µs corresponding to 2560 chips). These power control commands indicate to the mobile station to increase or decrease the transmission power by a fixed step size, e.g. 1 dB.

Furthermore for enhancing the uplink performance, it has been suggested in 3GPP (3rd Generation Partnership Project) to use hybrid automatic repeat control (H-ARQ), wherein the base station in case of a faulty reception of a data block can request a retransmission of the specific data block.

When requesting the retransmitted data block it is possible to combine the retransmitted version of the faulty data block with the first version of the faulty data block. Thus, the probability of detecting the data block correctly is increased. In order to achieve a high probability for correct detection of this data block, the retransmitted version of the data block is transmitted at the same power level as the first version of the respective faulty data block. Thus, there is a chance that such a retransmitted data block is finally received with a quality that is higher than the required quality. However, this is a waste of cell capacity.

SUMMARY OF THE INVENTION

It is therefore an object of the present invention to improve the cell efficiency.

This object is achieved by a method for controlling power in a network transmitted from a first station to a second station, wherein said second station determines a power target value for a signal received from said first station and sends power control commands to said first station depending on a deviation between said power target value and a received power level, said second station performing the steps of: detecting faulty data blocks received from said first station, requesting retransmission of faulty data blocks from said first station, and adjusting said power target value to a temporary power target value during said retransmission, wherein said temporary power target value is calculated depending on the quality of said faulty data block.

Furthermore, the above object is achieved by a device for controlling power in a network transmitted from a first station to said second station, comprising: means for determining a power target value for a signal received from said first station, means for generating power control commands for said first station depending on a deviation between said power target value and a received power level, means for detecting faulty data blocks received from said first station, means for requesting retransmission of faulty data blocks from said first station, and means for adjusting said power target value to a temporary power target value during said retransmission, wherein said temporary power target value being calculated depending on the quality of said faulty data block.

Accordingly, the invention utilizes the quality information of the faulty data block to create a new temporary power target value for use during the retransmission period of the specific retransmitted data block. Thus, the retransmitted data block is sent with a transmission power level in order to meet a temporary target value defined for the second station. Hence, the retransmission power value may be adjusted to a value that is neither too high nor too low, but matches such a value that is just needed in order to provide a correct detection of the data block that has been received faulty during its first transmission. As a result, the invention improves the transmission power level of the first terminal device for retransmitted data blocks. Thus, the cell efficiency can be optimized.

The invention has particularly the following impacts: Interference from the first station (the transmitting end) will be lowered as the required retransmission power (signal energy) is predicted by the second station (the receiving end) and communicated to the first station by using the power control commands. Furthermore, the battery consumption of the first station will be lowered as only a minimum of additional power is needed. Finally, it is possible to use a more aggressive data-rate during the first transmission of a data block as during retransmission errors that occurred due to a too aggressive data-rate can be corrected.

Preferably, the quality of the faulty received data block is estimated as a performance metric indicating how much additional signal energy is required in retransmission in order to detect a faulty data block correctly after reception of a retransmitted version of said faulty data block. Such an estimation is particularly advantageous when the faulty data block is combined with its retransmitted version. Then, the quality indicates how much additional signal energy is needed and substantially only this required energy is contained in the retransmitted data block. Thus, when combining the faulty received data block with the retransmitted version of this data block, the total signal energy is such, that the combined signal (first version in addition to the retransmitted version) meets exactly the signal energy that is required for correctly detecting the data block.

Preferably, the temporary power target value for retransmission is calculated as the power target value for a first transmission of a data block minus a term derived from the quality, e.g. by multiplying a value of the quality by a predetermined, in particular fixed, power control step size.

Preferably, the adjustment of the power target value is performed at the beginning of the retransmission of a faulty data block. In order to assure that the received power value is at the target value when the next data block begins, the power target value transitions from the temporary power target value to the power target value for first transmission of a data block before the next data block begins. Thus, the next data block is received at the desired regular power target value for first transmission of a data block.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENT

The preferred embodiments will now be described on the basis of an UMTS-WCDMA radio network. However, the invention can be used in other kinds of networks as well.

Figure 1:
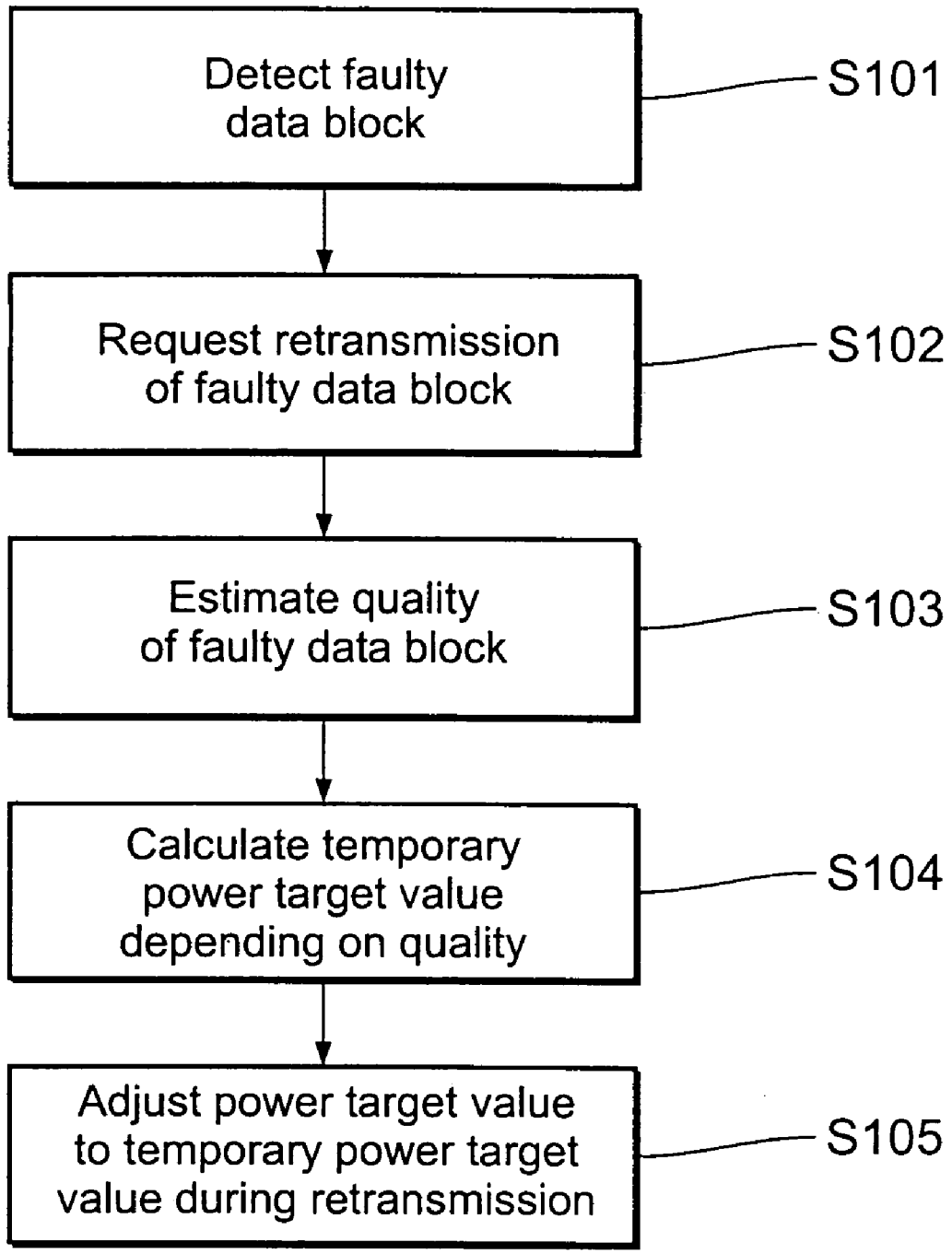
FIG. 1 shows a basic flow diagram of a power control operation according to a preferred embodiment of the present invention.

FIG. 1 shows a basic flow diagram of the basic operations used in a power control system according to a preferred embodiment of the invention. These operations are performed at the receiving end of a link, e.g. a base station, in particular a Node B when using a WCDMA UMTS system. The Node B receives a signal from a mobile station, e.g. a user equipment (UE). This link from the UE to the Node B is called the uplink.

However, the invention is not limited to the uplink transmission and can basically be performed in the downlink transmission as well. In this case, the receiving end of the link is the UE and the operations depicted in FIG. 1 are performed in the UE.

Generally, Node B informs the UE which power level has to be transmitted in the next time slot, possibly with some latency. Thereby, Node B uses power control commands to inform the UE about the power level which has to be transmitted in the next slot. These power control commands typically have fixed step sizes of e.g. 1 dB. However, other step sizes are suitable as well, such as 2.0 dB, 0.5 dB or 0.25 dB.

However, it occurs that the Node B receives faulty data blocks. In this case the Node B requests a retransmission of the original data block. The retransmitted data block can be either similar to the first faulty received data block or it may contain more redundancy information.

Preferably, when receiving a retransmitted data block, Node B combines the newly received information with the previous received information. Thus, the probability of detecting the respective data block correctly is increased. This so-called hybrid automatic repeat control (H-ARQ) may become very efficient in case of usage of aggressive UE transmission power, when the UE is usually unable to follow power control "UP"-commands due to hitting maximum power level.

In a first step S 101 Node B detects whether a received data block is erroneous, e.g. by means of cyclic redundancy checks (CRC). If a faulty data block is detected in step S 101 Node B sends in step S 102 a request for retransmission of the faulty data block to the UE.

Furthermore, Node B performs in step S 103 an estimation of the quality of the faulty data block. This quality estimation can be based on different mechanisms, e.g. on a bit error rate of the received data stream, a soft information obtained from a Viterby decoder used for decoding convolutional codes, and/or the signal-to-interference ratio (SIR) of the received signal. Thus, a performance metric is derived which indicates how much additional signal energy is required for the retransmission of a faulty data block in order to detect such faulty data block correctly after receiving its retransmitted version.

Then, in step S 104 this quality information is utilized to create a new temporary power target value, i.e. the target value for the power received at Node B from UE during the retransmission period of the specific data block. This temporary power target value is given as EB/N0 target for closed loop transmit power control (TPC), wherein EB/N0 indicates the level of received bit energy to interference density. This target value indicates the value which is estimated to be needed at Node B for proper decoding of the signal.

Finally, in step S 105 the power target value is adjusted to the temporary power target value used during retransmission of the data block that has previously been received faulty.

Figure 2:
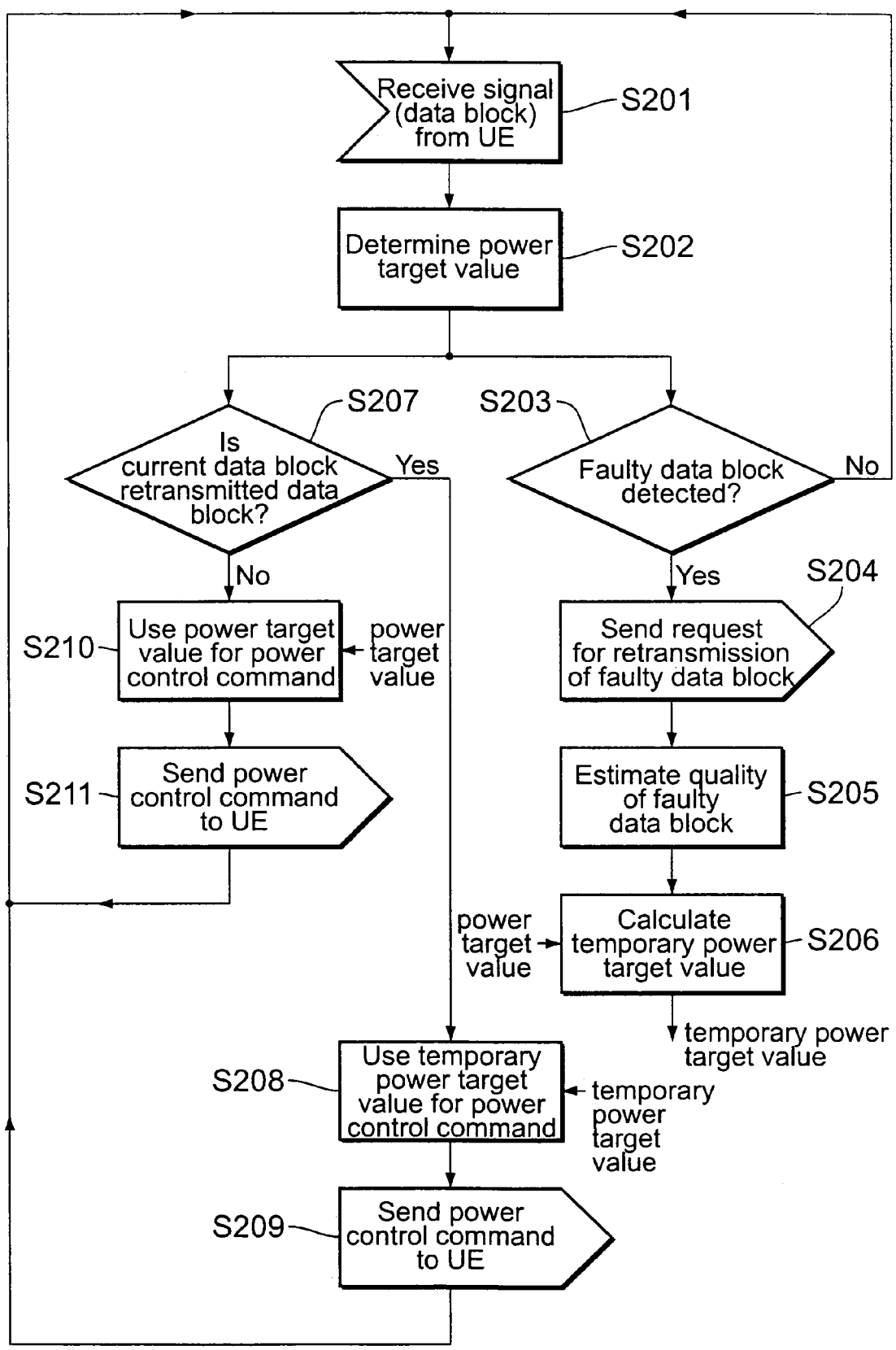
FIG. 2 shows a more detailed flow diagram of the power control operation according to FIG. 1.

FIG. 2 illustrates the power control steps performed in Node B in further detail. In step S 201 Node B receives a signal or data block from UE. Next, in step S 202 Node B determines the power target value.

Figure 3:
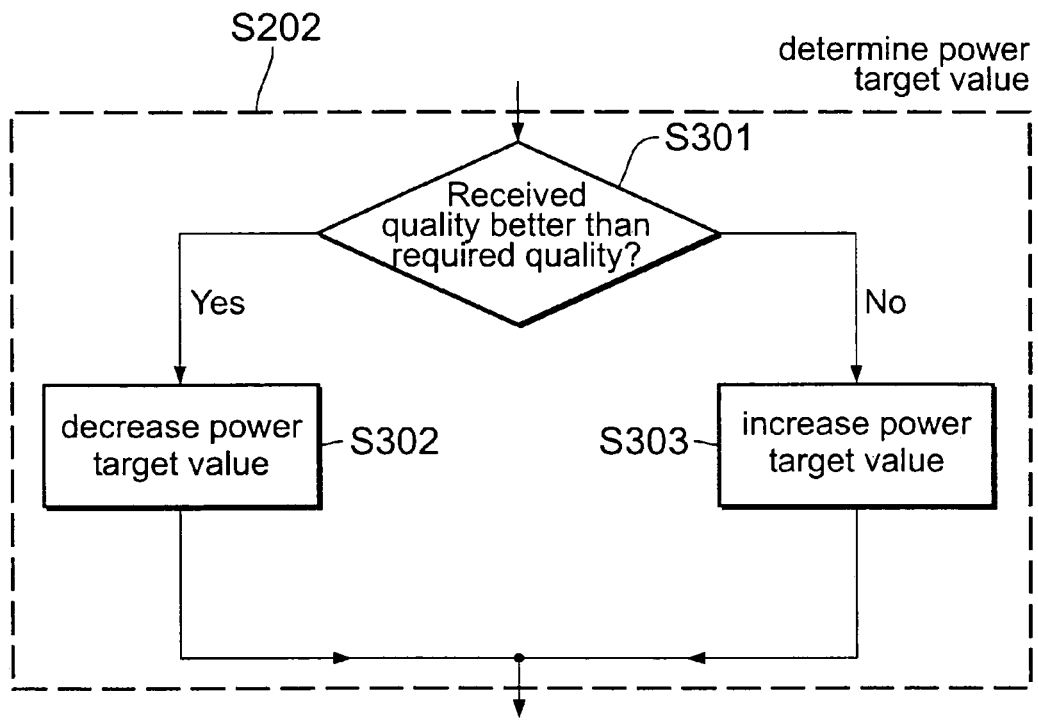
FIG. 3 shows a basic flow diagram of a block of the diagram according to FIG. 2 depicting the determination of the power target value.

FIG. 3 shows in more detail how the power target value is determined. In step 301 Node B determines whether the received quality is better than the required quality. In case of the received quality being better than the required quality, it is continued with step S 302 wherein the power target value is decreased. In case of the received quality being worse than the required quality it is continued with step S 303 wherein the power target value is increased.

Returning back to FIG. 2, it is checked in step S 203 whether a faulty data block is received. In case a faulty data block is detected it is continued with step S 204 wherein a message is sent to UE in order to request a retransmission of the faulty data block.

Furthermore, in step S 205 the quality of the faulty data block is estimated as described above.

Then, in step S 206 a temporary power target value is calculated for the retransmission of the faulty data block. Generally, the temporary power target value is calculated as a function of the current power target value and the quality estimate. Thus, a possible mapping into the temporary target value EB/N0 is given as:

$$Eb/N0\_target\_retrans = f(EB/N0\_target, quality)$$

wherein Eb/N0_target_retrans is the temporary power target value for retransmission and Eb/N0_target is the power target value for first transmission of a data block.

Figure 4:
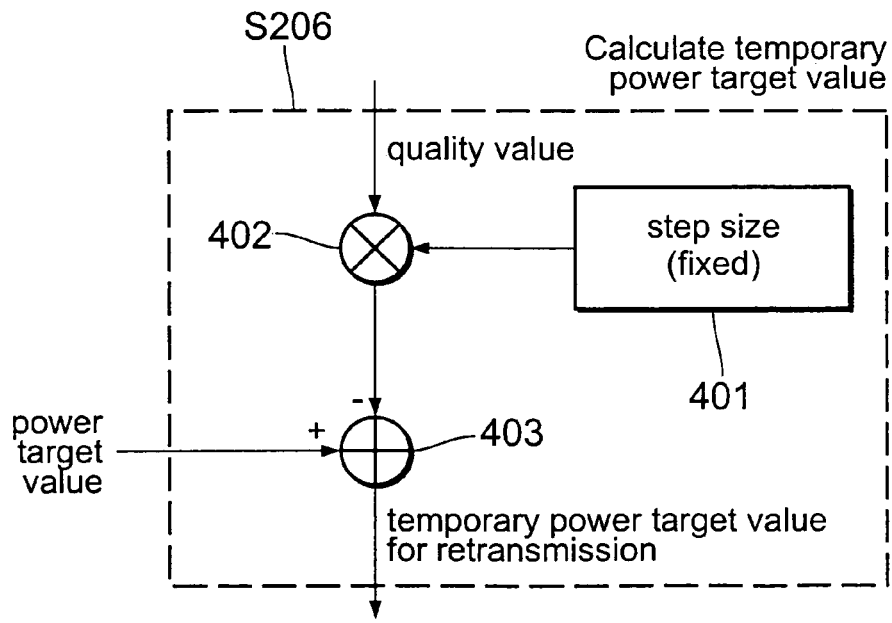
FIG. 4 shows a schematic block diagram of a block shown in the flow diagram according to FIG. 2 for calculation of the temporary power target value.

FIG. 4 shows a more specific implementation of calculating the temporary power target value.

On the one hand a value of the quality is weighted by a predetermined power control step size 401 that is input to a multiplication unit 402 as well as the quality value.

On the other hand the power target value determined in step S 202 is used in step S 206 as follows: Both, the power target value as well as the result of the multiplication unit 402 are fed to a subtraction unit 403 which subtracts the result of the multiplication unit 402 from the power target value in order to create the temporary power target value for retransmission.

As an example it is assumed that Node B has a quality scale where "0" is the worst quality estimation and "4" indicates a high reception quality. Then, a possible mapping into the temporary target value EB/N0 is given as:

$$Eb/N0\_target\_retrans = Eb/N0\_target - quality^* \times dB$$

wherein Eb/N0_target_retrans is said temporary power target value for retransmission, Eb/N0_target is said power target value for first transmission of a data block, and x is a fixed power control step size in dB.

This means that data blocks received with poor quality in the first transmission will be received with the same EB/N0 target for the retransmitted version, thus giving approximately 3 dB combining gain from H-ARQ, while the almost corrected received data blocks will be received at −4 dB EB/N0 target compared with the fist transmission of the respective data block. It is noted that Node B combines the initially faulty received data block with the retransmitted version of the data block.

Furthermore, it is noted that the scale given in the above example from 0 to 4 could be defined in any other way. However, this mechanism assures that the received power level at Node B is implicitly controlled by Node B through the EB/N0 target and that the power control commands sent to the UE are such that the received signal energy is just as high as required, i.e. the received signal energy is not substantially higher or lower than the required signal energy.

Returning back to FIG. 2, in step S 203 a branch is made to return to step S 201 if a data block is received correctly.

Substantially at the same time, as step S 203 is performed, a branch is made from step S 202 to step S 207. Thus, the path starting from S 202 is split and two separate flows are initiated. Node B determines in step S 207 whether a currently received data block is a retransmitted data block or a data block sent for the first time.

If a currently received data block is a retransmitted version of a previously sent data block, that has been received faulty, a branch is made to step S 208 wherein the temporary power target value derived in step S 206 is used for the following power control commands during the retransmission of the faulty received data block. Although steps S 203 and step S 207 may be performed substantially at the same time step S 208 is performed after step S 206 in order to be able to process the current temporary power target value generated in step S 206. However, it is noted that other sequences of the steps describe herein are possible as well. Therefore, the invention is not restricted to this specific embodiment.

In step S 209 power control commands generated on the basis of the temporary power target value are sent to UE.

Returning back to step S 207, if the currently received data block is a data block transmitted for the first time the power target value as determined in step S 202 is used in step S 210 in order to create a corresponding power control command for the UE which is sent in step S 211 to UE.

Figure 5:
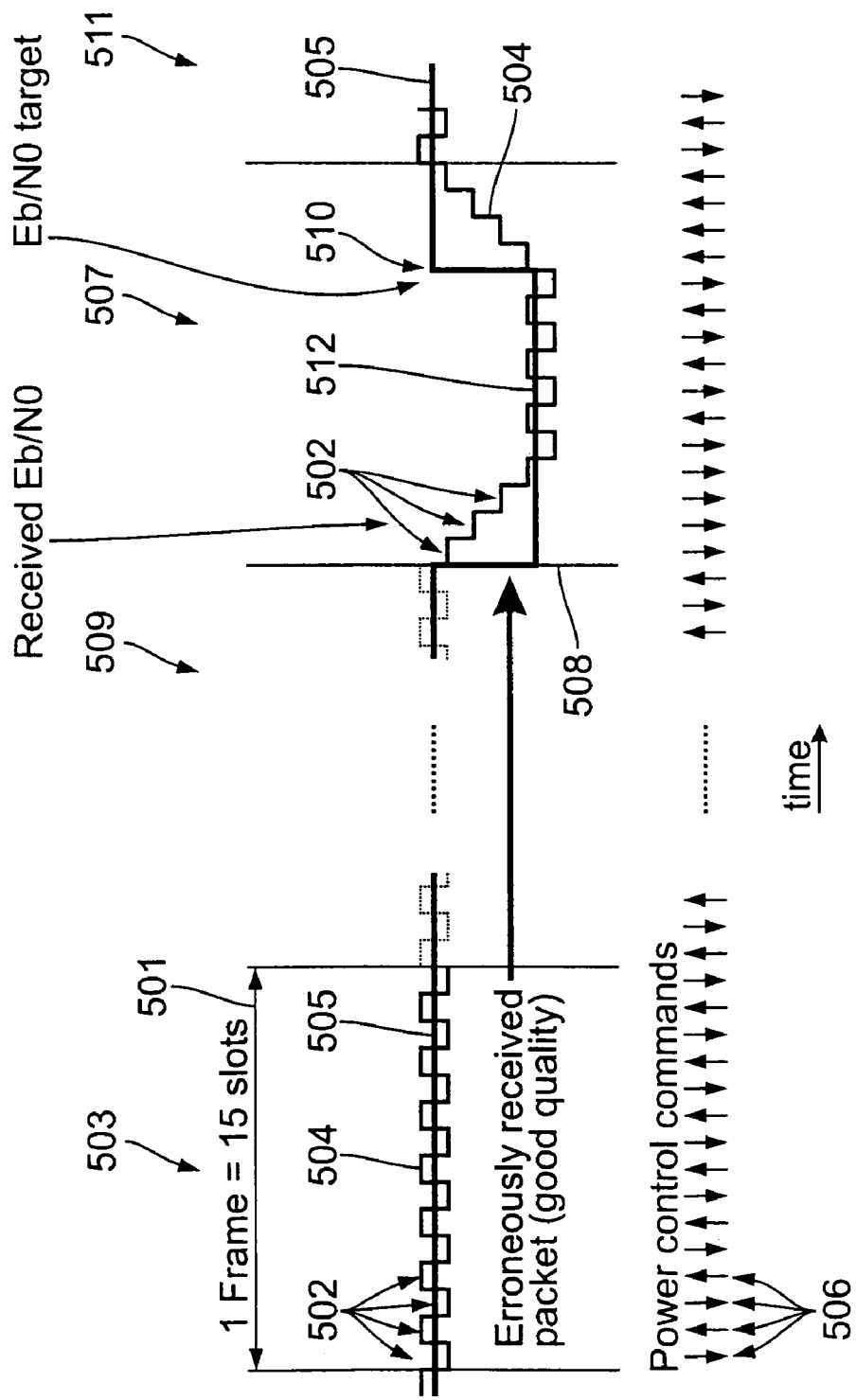
FIG. 5 shows a timing diagram illustrating the power target value, the temporary, power target value, the received power values as well as power control commands.

FIG. 5 is a timing diagram illustrating the instantaneous EB/N0 and the EB/N0 target for H-ARQ. During a first frame 501 comprising a number of (e.g. 15) slots 502, wherein the duration of a frame is e.g. 10 ms and wherein the duration of a slot is 660 µs corresponding to 2560 chips, a faulty data block 503 is received by Node B from UE.

Although the data block is erroneous, the quality is quite good. Thus, the actual received power level 504 is close to the power target value 505. Hence, power control commands 506 are alternating between "increase" or "UP" commands and "decrease" or "DOWN" commands. Thus, the received power level 504 is close to the power target value 505.

As, however, the received data block is a faulty data block 503, Node B requests for a retransmission of this data block. However, the retransmission of the specific data block does not necessarily have to be the subsequent data block, but can be received one or several data blocks after the faulty data block 503. The retransmitted version of this specific data block is indicated as 507.

As in the example of FIG. 5, the first data block 503 is received faulty, but the received quality measure at Node B indicates that the data block will not require much more signal energy in order to be detected correctly, a relatively low power (temporary power target value 512) can be used for retransmission, i.e. for the retransmitted data block 507.

It is noted that the adjustment of the EB/N0 target, i.e. from the power target value 505 to the temporary power target value 512 takes place at the beginning 508 of the retransmitted data block 507, in order not to influence a previous data block 509.

Furthermore, it is noted that the transition 510 from the temporary power target value 512 back to the original EB/N0 target state, i.e. the original power target value 505 is such that it is assured that the received EB/N0, i.e. the received power level 504 is at the respective target value when the subsequent data block 511 begins.

Thus, the number of slots 502 that the temporary EB/N0, i.e. the temporary power target value 512, is in use depends on the following parameters: The power control step size, the packet size or data block size in slots, and the "distance" between the normal EB/N0 target, i.e. the power target value 505 for first transmission of a data block, and the temporary EB/N0 level, i.e. the temporary power target value 512 for retransmission of a faulty data block.

As shown in FIG. 5, there is a small delay before the temporary power target value 512 is met. During this period the UE transmits more power than needed. Preferably, this is taken into account when setting the temporary power target value 512 for retransmission.

As being indicated in FIG. 5, a power control command 506 may consist of a single bit indicating whether to increase or to decrease a transmission power level of the UE by a fixed power control step size (e.g. 1 dB).

However, the invention is not limited to such power control commands. Moreover, a power control command may comprise a number of bits indicating whether to increase or to decrease the transmission power level by certain variable power control step size.

Furthermore, a power control command may comprise a number of bits indicating explicitly an (absolute) value for the transmission power level of the UE.

Thus, the required transmission or retransmission power can be either implicitly or explicitly communicated to the UE by corresponding power control commands. By explicitly communicating the power control commands to the UE additional new layer 1(L1) control signaling is used in the downlink from Node B to UE (on top of ACK/NACK information). Such additional information is preferably condensed to a very few bits.

By implicitly communicating the power control commands to the UE any additional signaling between Node B and UE is avoided.

Figure 6:
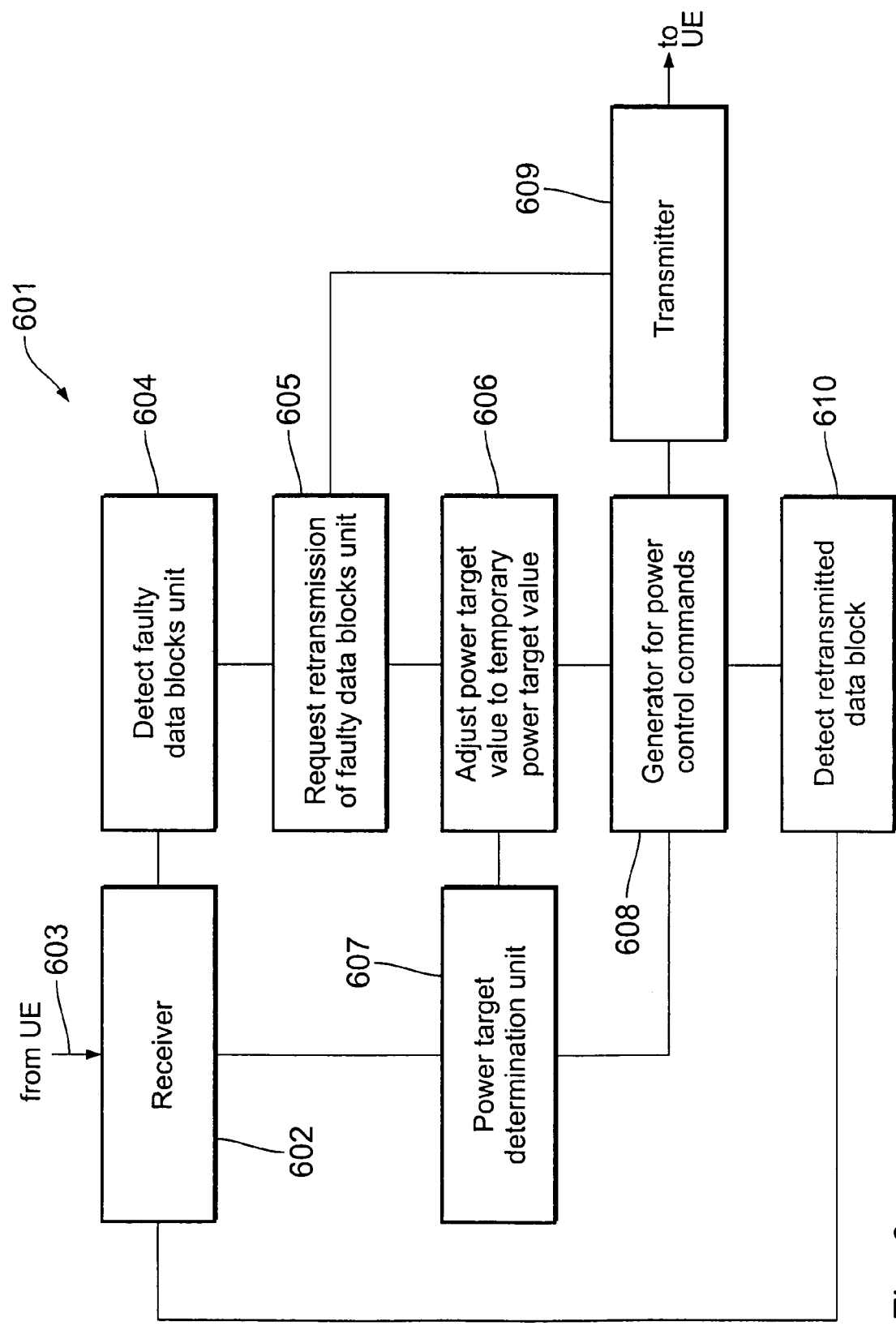
FIG. 6 shows a schematic block diagram of a device according to a preferred embodiment of the present invention.

FIG. 6 shows a schematic block diagram of a device according to an embodiment of the present invention. A Node B 601 comprises a receiver 602 receiving a signal 603 from UE (not shown). Receiver 602 is connected with a unit 604 for detecting faulty data blocks which in turn is connected to a unit 605 for requesting retransmission of faulty data blocks, in particular generating a request message for retransmission, wherein such message will be send to UE.

Furthermore, unit 605 for requesting retransmission is connected to a unit 606 for adjusting the power target value to the temporary power target value which has been communicated to unit 606 from a power target determination unit 607 which is connected with unit 606.

Furthermore, the unit 606 for adjustment of the power target value to the temporary power target value is connected to a generator 608 for power control commands which in turn is connected to a transmitter 609 for sending such power control commands to UE. Furthermore, transmitter 609 is connected with the request retransmission unit 605 in order to transmit the corresponding request message for retransmission of a faulty data block to UE.

Generator 608 for power control commands is furthermore connected to a detection unit 610 which is as well connected to receiver 602 in order to inform the generator about whether an actual received data block is a retransmitted data block or a data block sent for the first time. Depending on this information generator 608 selects either the temporary power target value received from unit 606 or the normal power target value received via a corresponding connection from power target determination unit 607. Thus, Node B corresponding to FIG. 6 is equipped in order to perform a method as being illustrated in FIG. 1 to 4 in order to generate signals according to FIG. 5.

It is noted that the present invention is not restricted to the preferred embodiments described above. In particular the functionalities of Node B and UE can be exchanged so that uplink and downlink will be exchanged as well. Moreover, the present invention is not restricted to the combination of a mobile station and a base station but can be used between any combination of such stations. The preferred embodiments may thus vary within the scope of the attached claims.

The invention claimed is:

1. A method for controlling power in a network transmitted from a first station to a second station, wherein said second station determines a power target value for a signal received from said first station and sends power control commands to said first station depending on a deviation between said power target value and a received power level, said second station performing the steps of:
    detecting faulty data blocks received from said first station,
    requesting retransmission of faulty data blocks from said first station, and
    adjusting said power target value to a temporary power target value during said retransmission, wherein said temporary power target value for retransmission is calculated depending on, a quality of said faulty data block, as the power target value for first transmission of a data block minus the quality weighted by a predetermined power control step size.

2. A method according to claim 1, wherein said quality is estimated as a performance metric, which indicates how much additional signal energy is required during retransmission in order to detect a faulty data block correctly after receiving a retransmitted version of said faulty data block.

3. A method according to claim 1, wherein said faulty data block is combined with its retransmitted version.

4. A method according to claim 1, wherein said retransmitted version is similar to the first version of said faulty data block.

5. A method according to claim 1, wherein said retransmitted version contains additional redundancy.

6. A method according to claim 1, wherein said temporary power target value for retransmission is calculated as a function of the current power target value for first transmission of a data block and the quality.

7. A method according to claim 6, wherein said temporary power target value is calculated based on the following equation:

$$Eb/N0\_target\_retrans = Eb/N0\_target - quality * x \text{ dB}$$

wherein Eb/N0_target_retrans is said temporary power target value for retransmission, Eb/N0_target is said power target value for first transmission of a data block, and x is a fixed power control step size in dB.

8. A method according to claim 1, wherein said adjustment of said power target value is performed at the beginning of a retransmission of a faulty data block.

9. A method according to claim 1, wherein a transition back to the power target value for first transmission of a data block is performed before the beginning of the next data block, such that the received power level is at the power target value for first transmission when the next data block begins.

10. A method according to claim 1, wherein a data block is divided into a number of slots and wherein the number of slots that said temporary power target value is in use depends on said power control step size, the total number of slots within a data block, and the distance between said power target value for first transmission and said temporary power target value.

11. A method according to any one of the proceeding claims, wherein said temporary power target value is calculated depending on a delay before said temporary power target value is met.

12. A method according to claim 1, wherein said power control commands respectively comprise a bit indicating whether to increase or to decrease a transmission power level of said first station by said fixed power control step size.

13. A method according to claim 1, wherein said power control commands respectively comprise a number of bits indicating whether to increase or to decrease said transmission power level as well as indicating a variable power control step size.

14. A method according to claim 1, wherein said power control commands respectively comprise a number of bits indicating an explicit value for said transmission power level.

15. A method according to claim 1, wherein said step of detecting faulty data blocks comprises a cyclic redundancy check.

16. A method according to claim 1, wherein said quality is estimated based on
   a) a bit or packet error rate of the received data stream,
   b) soft information obtained from a Viterbi decoder used for decoding convolutional codes, and/or
   c) the received signal-to-interference ratio.

17. A device for controlling power in a network transmitted from a first station to said second station, comprising:
   means for determining a power target value for a signal received from said first station,
   means for generating power control commands for said first station depending on a deviation between said power target value and a received power level,
   means for detecting faulty data blocks received from said first station,
   means for requesting retransmission of faulty data blocks from said first station,
   means for adjusting said power target value to a temporary power target value during said retransmission, wherein said temporary power target value being calculated depending on a quality of said faulty data block, as the power target value and
   means for calculating said temporary power target value for retransmission as the power target value for first transmission of a data block minus the quality weighted by a predetermined power control step size.

18. A device according to claim 17, wherein said second station is a base station and said first station is a mobile station used in a mobile network, in particular in an UMTS/WCDMA network.

19. A device according to claim 17, comprising means for carrying out a method for controlling power in a network transmitted from a first station to a second station, wherein said second station determines a power target value for a signal received from said first station and sends power control commands to said first station depending on a deviation between said power target value and a received power level,
   said second station performing the steps of:
   detecting faulty data blocks received from said first station,
   requesting retransmission of faulty data blocks from said first station, and
   adjusting said power target value to a temporary power target value during said retransmission, wherein said temporary power target value for retransmission is calculated depending on the quality of said faulty data block as the power target value for first transmission of a data block minus the quality weighted by a predetermined power control step size.

* * * * *